United States Patent [19]

Chapman

[11] Patent Number: 4,826,134
[45] Date of Patent: May 2, 1989

[54] INTAKE VALVE FOR AIR COMPRESSORS AND THE LIKE

[76] Inventor: Walter R. Chapman, 4835 W. 23 St., Erie, Pa. 16506

[21] Appl. No.: 225,606

[22] Filed: Jul. 27, 1988

Related U.S. Application Data

[63] Continuation of Ser. No. 97,299, Sep. 14, 1987, abandoned, which is a continuation of Ser. No. 871,297, Jun. 6, 1986, abandoned.

[51] Int. Cl.⁴ .............................................. F16K 1/46
[52] U.S. Cl. ..................................... 251/333; 251/900; 251/63.5
[58] Field of Search ..................... 251/900, 333, 63.5

[56] References Cited

U.S. PATENT DOCUMENTS

| | | | |
|---|---|---|---|
| 2,752,941 | 7/1956 | Mitchell | 251/333 X |
| 2,778,598 | 1/1957 | Bolling, Jr. | 251/333 X |
| 3,366,138 | 1/1968 | Graham | 251/333 X |
| 4,014,510 | 3/1977 | Smith | 251/900 X |
| 4,162,795 | 7/1979 | Kanics | 251/900 X |
| 4,345,739 | 8/1982 | Wheatley | 251/900 X |
| 4,441,687 | 4/1984 | Pauliukonis | 251/900 X |

FOREIGN PATENT DOCUMENTS

| | | | |
|---|---|---|---|
| 714339 | 7/1965 | Canada | 251/900 |
| 1077463 | 4/1954 | France | 251/900 |

Primary Examiner—Arnold Rosenthal
Attorney, Agent, or Firm—Ralph Hammar

[57] ABSTRACT

A valve having a valve member of diameter less than the bore of an air compressor inlet which closes against a seal of flexible material such as TFE projecting into the bore of the inlet.

7 Claims, 1 Drawing Sheet

INTAKE VALVE FOR AIR COMPRESSORS AND THE LIKE

This is a continuation of Ser. No. 097,299, filed Sept. 14, 1987, now abandoned, which is a continuation of Ser. No. 871,297, filed June 6, 1986, and now abandoned.

In air compressors, it is desirable that the intake air be through a control valve which partially closes as the demand for air decreases and which shuts off when the desired air pressure is reached. The complete shut-off prevents back flow of oil through the intake when the compressor is shut down.

This invention is a control valve which is more convenient to make and use.

Figure 2:
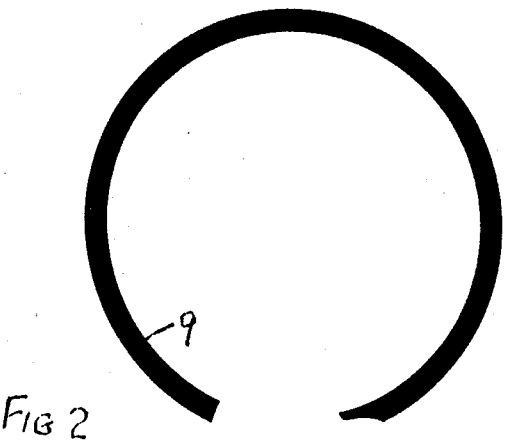
Figure 1:
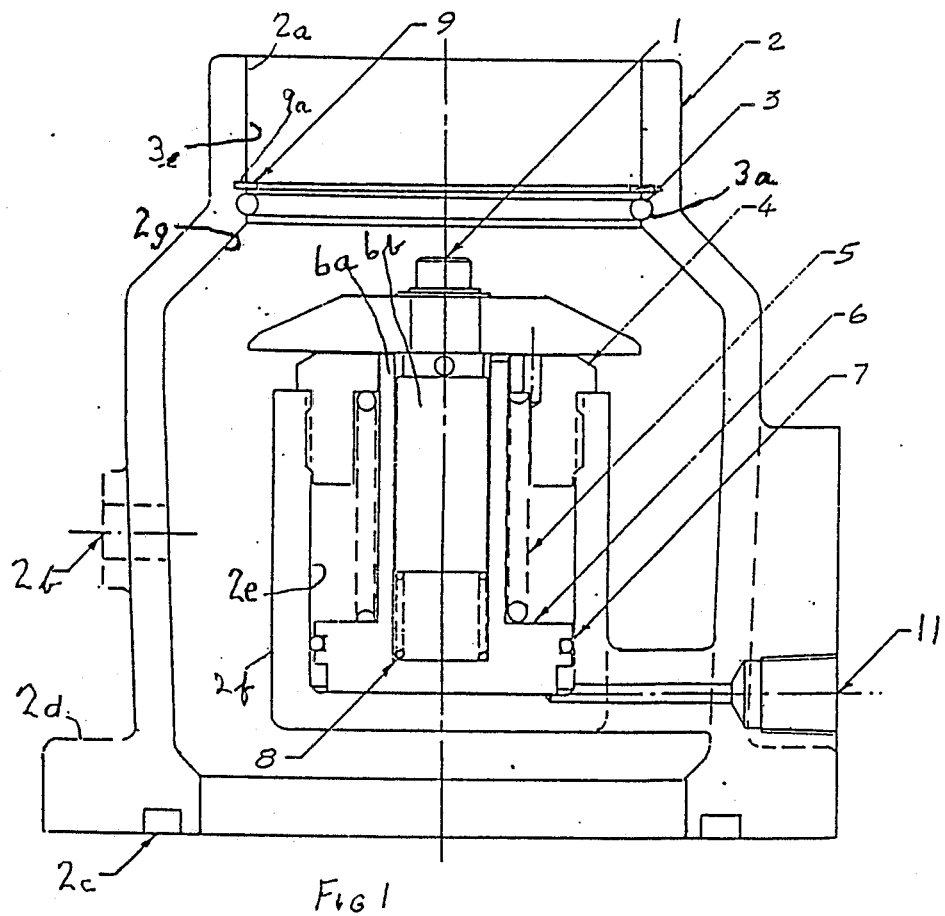

In the drawing, FIG. 1 is a diametrical section through an intake valve, and FIG. 2 is a plan view of the back-up ring for the O-ring seat.

The valve comprises two basic components, a valve assembly 1 and a valve body 2. The valve body which may be a casting has an air intake 2a at its upper end of greater inside diameter than the outside diameter of the valve assembly 1. The valve body also is provided with ports 2b with an O-ring seal groove 2c and a flange connection 2d provided with bolt openings (not shown). The body also has a bore 2e slidably receiving piston 6 having an O-ring (piston ring) seal 7 between the piston and the bore 2e. On the upper side of the piston 6 is an integral tubular extension 6a slidably receiving valve stem 6b. There is no stop to upward travel of the valve stems.

The valve assembly is smaller in diameter than the bore 3e of the air intake 2a. The valve assembly (consisting of piston 6, integral extension 6a, valve member 6b, 6c) therefore bore 3e of the air intake 2a. The valve assembly therefore can be dropped in place in the cylinder 2f through the bore 3e and through the open upper end of air intake 2a when the groove 3a is empty, i.e. before O-ring is inserted in groove 3a. After the O-ring is inserted, removal of the valve assembly is barred by th O-ring which acts as a snap ring. The valve assembly is shown through the intake of the compressor. As the air pressure builds up in the reservoir or tank supplied by the compressor, a control signal pressure corresponding to the tank pressure is suplied to the space between the lower end of the piston 6 and the bottom of the cylinder 2f. The control pressure is received by fitting 11. The pressure causes the piston 6 and valve members 6a, 6b to rise as a unit toward the flexible seal O-ring 3 in groove 3a in the lower intake bore 2e. The ring 3 in not used as a conventional O-ring seal. The outer half fits in and is retained by the groove 3a. The inner half projects into the bore and makes sealing engagement with the valve member 6b. The ring need not be of circular cross section, as shown. Any other shape e.g. square, rectangular may be used. When the pressure is completely satisfied, the bevel 6c on the outer periphery of the valve member 6b is stopped against and makes sealing engagement with the O-ring 3. Valve member 6b never slides by O-ring 3. At high pressures the O-ring may be deformed and bulge out of the groove 3a and make contact with a snap ring 9 in a groove 9a in the bore 2e of the air intake 2a. Snap ring 9 blocks movement of the O-ring 3 out of groove 3a. The seal 3 may be made of any compatible material which has the flexibility to provide sealing between contacting surfaces and is rigid enough to stay in the groove under the operating pressure and temperature conditions e.g. TFE. The seal may be a continuous ring as shown or it may be a single piece bent in the form of a circle with a joint between the ends as in a piston ring. The seal could be of metal with a coating of TFE in the area which makes sealing engagement with the valve member.

I claim:

1. An intake valve for air compressors and the like which prevents back flow of oil when the compressor is shut down, said valve having a body with an intake way through which flow of intake air to the compressor is to be controlled, said body having a first internal groove in said body in a plane perpendicular to said way, a snap ring of TFE having its outer half fitting in and retained by said first groove and its inner half projecting radially inward from said groove into said way, and a valve member downstream of said first groove, said valve member being of outside diameter less than the inside diameter of said way whereby said valve member may be assembled through said way before (but not after) the TFE snap ring is snapped into said first groove and the outside diameter of said valve member being greater than the inside diameter of said TFE snap ring, said valve member being movable upstream until stopped against and making sealing engagement with said inner half of said TFE snap ring to close said way to the flow of air to the compressor and to the back flow of oil from the compressor and said valve member being movable downstream away from said inner half of said snap ring to open said way to the flow of intake air to the compressor.

2. The structure of claim 1 in which said valve member has a bevel surface contacting the inner half of said snap ring and wedging said snap ring into said groove.

3. An intake valve for air compressors and the like which prevents back flow of oil when the compressor is shut down, said valve having a body with an intake way through which flow of intake air to the compressor is to be controlled, said body having a first internal groove in said body in a plane perpendicular to said way, a snap ring of TFE having its outer half fitting in and retained by said first groove and its inner half projecting radially inward from said groove into said way, and a valve member downstream of said first groove, said valve member being of outside diameter less than the inside diameter of said way whereby said valve member may be assembled through said way before (but not after) the TFE snap ring is snapped into said first groove and the outside diameter of said valve member being greater than the inside diameter of said TFE snap ring, said valve member being movable upstream until stopped against and making sealing engagement with said inner half of said TFE snap ring to close said way to the flow of air to the compressor and to the back flow of oil from the compressor and said valve member being movable downstream away from said inner half of said snap ring to open said way to the flow of intake air to the compressor, said valve member having a bevel surface contacting the inner half of said snap ring and wedging said snap ring into said groove, said body having a second internal groove upstream of said first groove, a single metal snap ring in said second groove for blocking movement of said first snap ring out of said first groove.

4. The structure of claim 2 in which said bevel surface is at substantially a 45° angle.

5. The structure of claim 1 in which the TFE snap ring is a length of material formed in a circle with ends forming a joint.

6. An intake valve for air compressors and the like which prevents back flow of oil when the compressor is shut down, said valve having a body with an intake way through which flow of intake air to the compressor is to be controlled and a cylinder receiving valve assembly 6, 6a, 6b, 6c and a controlpressure for the valve assembly,
  said body having a first internal groove in said body in a plane perpendicular to said way, p1 a snap ring of TFE having its outer half fitting in and retained by said first groove and its inner half projecting radially inward from said groove into said way and serving as a seat and as a retaining ring for said valve assembly for blocking removal of said valve assembly, said valve assembly being downstream of said first groove, said valve assembly being of outside diameter less than the inside diameter of said way whereby said valve assembly may be assembled through said way before (but not after) the TFE ring is snapped into said first groove and the outside diameter of said valve assembly being greater than the inside diameter of said snap ring, said valve assembly being movable upstream until stopped against and making sealing engagement with said inner half of said TFE snap ring to close said way and movable downstream away from said inner half of said TFE snap ring to open said way.

7. Valve having a body with a way through which flow of fluid is to be controlled.
  said body having a first internal groove in said body in a plane perpendicular to said way,
  a snap ring of TFE having its outer half fitting in and supported by said first groove and its inner half unsupported and projecting radially inward from said groove into said way,
  and a valve member downstream of said first groove, said valve member being of outside diameter less than the inside diameter of said way whereby said valve member may be assembled through said way before (but not after) the TFE snap ring is snapped into said first groove and the outside diameter of said valve member being greater than the inside diameter of said TFE snap ring, said valve member being movable upstream until stopped against and making sealing engagement with said inner half of said TFE snap ring to close said way to the flow of fluid and said valve member being movable away from said inner half of said TFE snap ring to open said way to the flow of fluid.

* * * * *